United States Patent
Zuber et al.

(10) Patent No.: US 8,052,845 B2
(45) Date of Patent: Nov. 8, 2011

(54) REFLUX DIVIDER FOR A COLUMN HAVING PORTIONS FOR THE TRANSFER OF MATERIAL ARRANGED IN PARALLEL

(75) Inventors: Laurent Zuber, Winterthur (CH); Christian Gottlieb Bachmann, Ellikon an der Thur (CH); Ilja Ausner, Berlin (DE)

(73) Assignee: Sulzer Chemtech AG, Winterthur (CH)

( * ) Notice: Subject to any disclaimer, the term of this patent is extended or adjusted under 35 U.S.C. 154(b) by 782 days.

(21) Appl. No.: 12/080,376

(22) Filed: Apr. 2, 2008

(65) Prior Publication Data

US 2008/0251127 A1 Oct. 16, 2008

(30) Foreign Application Priority Data

Apr. 10, 2007 (EP) .................................... 07105858

(51) Int. Cl.
*B01D 3/14* (2006.01)
*B01D 3/42* (2006.01)
*F17D 1/13* (2006.01)

(52) U.S. Cl. ........ 202/158; 137/262; 137/486; 137/861; 159/43.1; 159/44; 202/161; 202/262; 203/1

(58) Field of Classification Search ................. 159/43.1, 159/44; 202/158, 161, 237, 262; 203/1; 137/262, 486, 861
See application file for complete search history.

(56) References Cited

U.S. PATENT DOCUMENTS

| | | | | |
|---|---|---|---|---|
| 2,816,858 | A | * 12/1957 | Walker | ............................... 203/2 |
| 3,290,924 | A | * 12/1966 | Ebner et al. | ................... 73/61.76 |
| 3,412,016 | A | 11/1968 | Graven | |
| 4,230,533 | A | 10/1980 | Giroux | |
| 5,120,403 | A | * 6/1992 | Smith, Jr. | ........................... 203/1 |

FOREIGN PATENT DOCUMENTS

DE 10 2006 016789 10/2007
WO WO 2004/071618 8/2004
* cited by examiner

*Primary Examiner* — Virginia Manoharan
(74) *Attorney, Agent, or Firm* — Francis C. Hand; CarellaByrneCecchi

(57) ABSTRACT

The reflux divider for a separation column has portions for the transfer of material arranged in parallel which are mutually bounded by a vertical dividing wall and which include members for the controlled dividing of a liquid to be treated. A reflux divider feeds part flows to the respective portions employing connection lines that are feed from a common container. A restrictor valve is used in one connection line to control the flow based on signals from a pair of flow meters.

10 Claims, 5 Drawing Sheets

REFLUX DIVIDER FOR A COLUMN HAVING PORTIONS FOR THE TRANSFER OF MATERIAL ARRANGED IN PARALLEL

This invention relates to a reflux divider for a column having portions for the transfer of material arranged in parallel. More particularly, this invention relates to a column having a reflux divider as well as to a method of operating the reflux divider.

Dividing wall columns are occasionally used for the separation of a liquid multicomponent mixture. With such a column, portions for the transfer of material are arranged in parallel in a middle region of the column and are mutually bounded by a vertical dividing wall. During operation, a reflux is collected over the region of the dividing wall after treatment in at least one material transfer stage. This reflux is then divided into two part flows with constant relative portions and further treated in the portions for the transfer of material within the column.

The multicomponent mixture is fed into the one of these portions in addition to the one of the two part flows at a position disposed further down the column and a component of the mixture is removed from the other portion of the column.

In a known reflux divider, a powered shuttle valve is actuated to form the two part flows which intermittently allows the first part flow to flow into one corresponding portion during a first time period and a second part flow into the other corresponding portion during a second time period. The two time portions form a period of the intermittent procedure which lasts around between 3 and 30 seconds. However, the shuttle valve and the drive for the valve are under a relatively intense strain so that a replacement of the valve and/or drive frequently becomes necessary.

Accordingly, it is the object of the invention to provide a reflux divider which is less prone to failure than the known one.

It is another object of the invention to provide a reflux divider for a multi-component separator column that has a relatively long service life.

Briefly, the invention is directed to a separator comprising at least a pair of portions for the transfer of material disposed in parallel, a vertical dividing wall separating the pair of portions and a liquid collector above the dividing wall for receiving a flow of reflux liquid.

In accordance with the invention, the liquid collector has a ring passage for collecting the reflux liquid therein between a minimum level and a maximum level thereof and a reflux divider is provided for dividing of the reflux liquid for delivery to each of the pair of portions.

The reflux divider includes a first connection line connected to the container below the minimum level to conduct a first part flow of the reflux liquid therefrom to a first of the pair of portions. In addition, the reflux divider has an enclosed chamber disposed within the container with at least one opening communicating with the container for a restricted flow of liquid reflux into the chamber to form a second part flow of the reflux liquid and a second connection line in communication with the chamber to conduct the second part flow of the reflux liquid therefrom to a second of the pair of portions.

The connection lines for two part flows are advantageously arranged outside the column.

A part space or chamber bounded by a wall is arranged in the container upstream of the second connection line. At least one opening for a restricted liquid passage is provided in the wall of this part space for the formation of the second part flow. The reflux divider also employs a controlled restrictor valve in the first connection line as well as flow meters for the control of the restrictor valve. The reflux divider has the decisive advantage with respect to the known reflux divider described above that the two part flows are not formed by means of an intermittent procedure and can consequently be supplied to distributors continuously and with largely constant flow strengths. With the already known formation of the part flows, the distributors have a buffering effect which, however, does not allow any flow strengths which remain constant.

The reflux divider in accordance with the invention additionally only requires commercial measuring and control units and not expensive special designs.

These and other objects and advantages of the invention will become more apparent from the following detailed description taken in conjunction with the accompanying drawings wherein.

Figure 1:
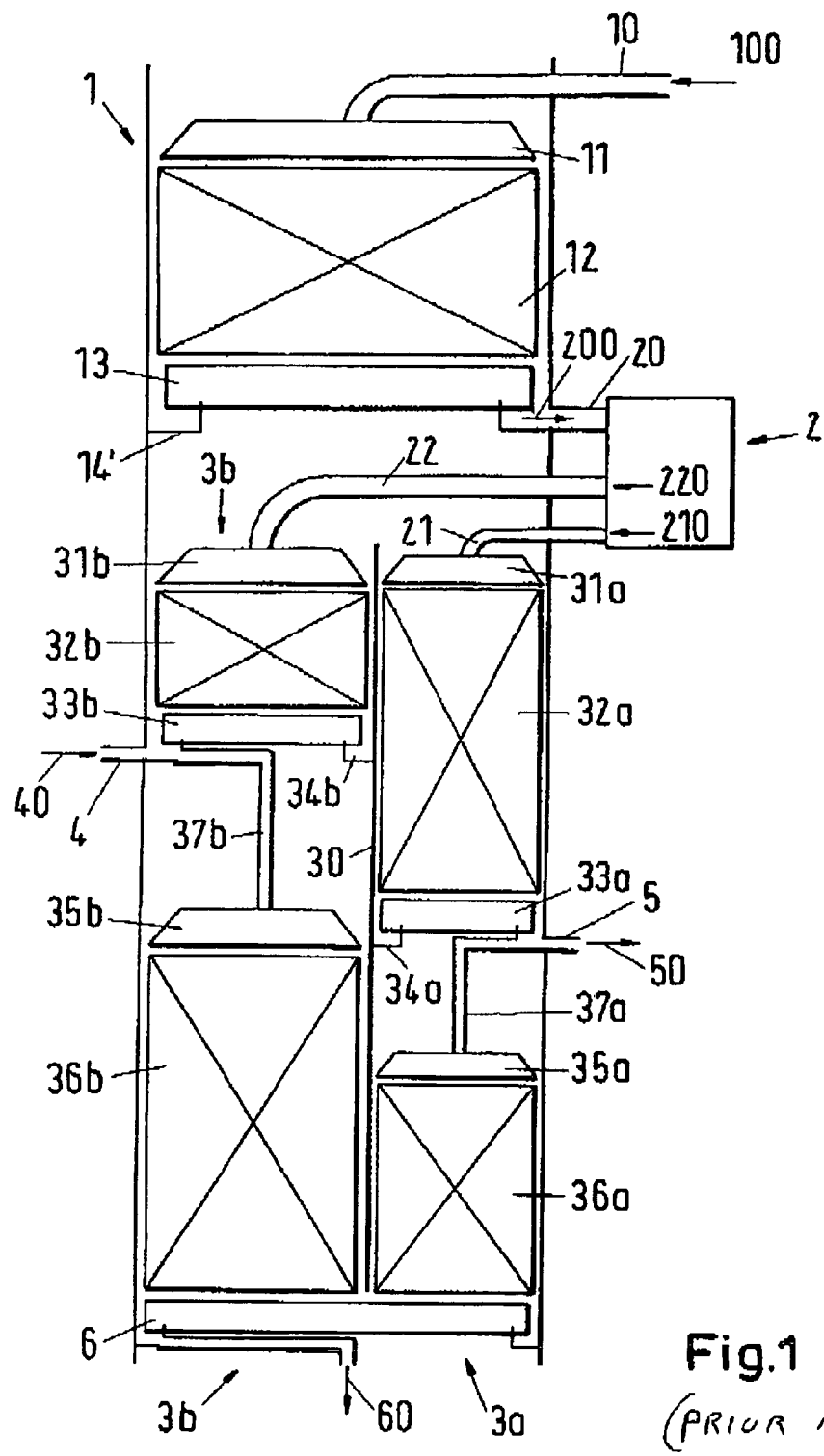
FIG. 1 illustrates a cross-sectional view of a conventional dividing wall column employing a reflux divider.

Referring to FIG. 1, the dividing wall column 1 has a reflux divider 2 disposed to the outside of the column and houses two portions 3a, 3b for the exchange of material that are arranged in parallel and that are mutually bounded by a vertical dividing wall 30.

One portion 3a includes an upper distributor 31a, an upper packing 32a, an upper collector 33a with a ring passage 34a, a lower distributor 35a and a lower packing 36a.

The other portion 3b includes an upper distributor 31b, an upper packing 32b, an upper collector 33b with a ring passage 34b, a lower distributor 35b and a lower packing 36b.

The lower distributors 35a and 35b are each connected to the upper collectors 33a and 33b respectively via lines 37a and 37b.

A collector 6 common to both portions 3a and 3b conducts liquid 60 further into a lower part of the dividing wall column 1 which is not shown.

A feed point 4 for a liquid mixture 40 to be separated is connected to the ring passage 34b. This mixture 40 includes at least three components.

A product 50 of the dividing process is removed from the ring passage 34a at a dispensing point 5.

A reflux flow 100 is supplied through a line 10 and a distributor 11 into a packing 12 at the head of the column 1. A collector 13 with a ring passage 14' below the packing 12 conducts the liquid to be treated in the portions 3a and 3b for the transfer of material through a line 20 into the reflux divider 2 which is arranged outside the column 1. This liquid to be treated forms the inlet flow 200 of the reflux divider 2. Such a reflux divider 2 is known from the prior art. Members of the reflux divider 2 (not shown) produce two part flows 210 and 220 in a controlled manner from the input flow 200 that are then fed into the portions 3a and 3b respectively through lines 21 and 22.

Figure 2A:
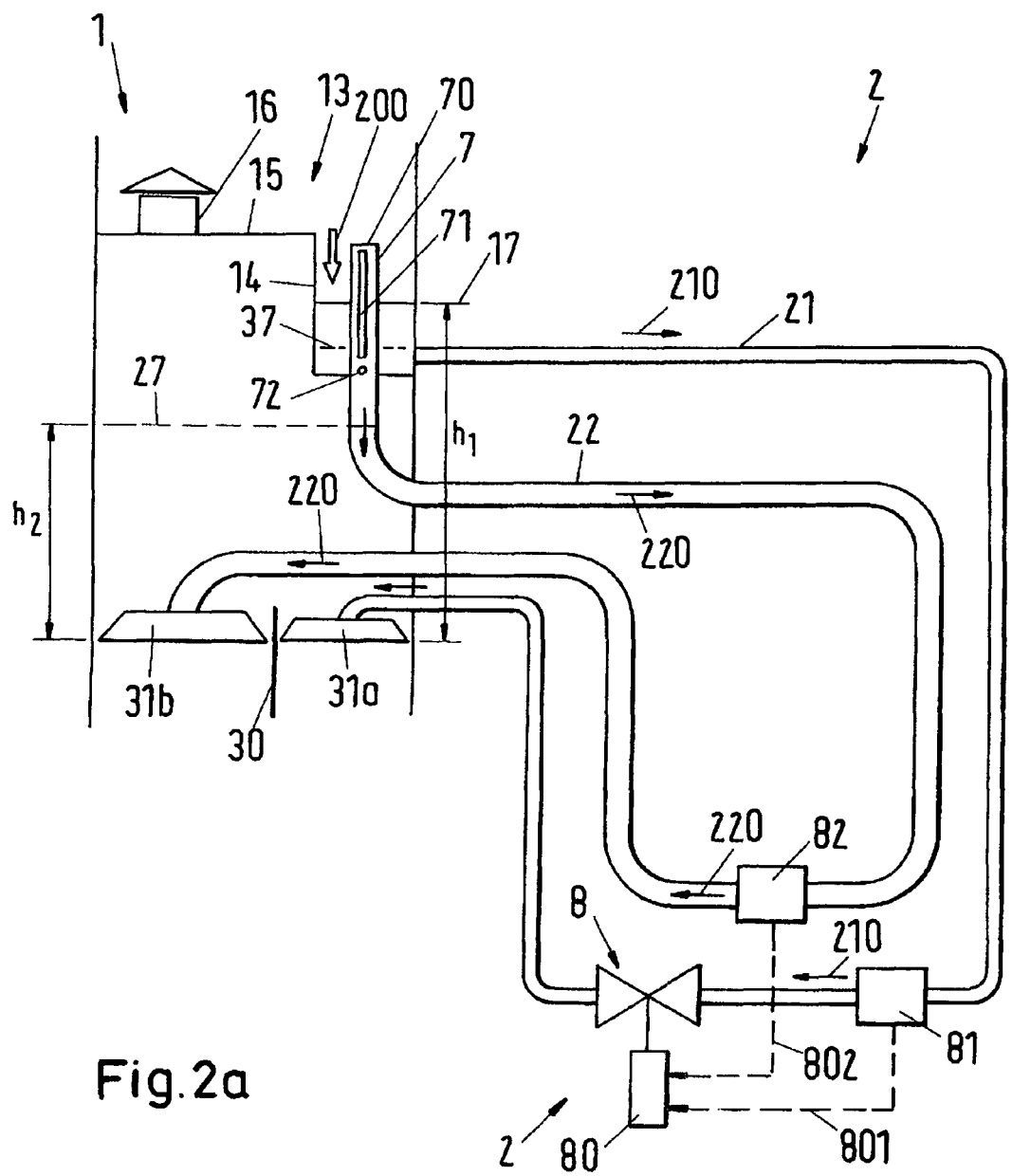
FIG. 2a illustrates a schematic view of a reflux divider in accordance with the invention.

Referring to FIG. 2a, wherein like reference characters indicate like parts as above, the collector 13 from which the inlet flow 200 with the liquid to be treated is removed includes, in the example shown, a tray 15, stacks 16 for conducting vapor through the tray 15 and a container 14. As a rule, the collector 13 has a different design; the container 14 can in particular be made as a ring passage 14' (see FIG. 1). Two connection lines 21 and 22 lead from the container 14 to the two distributors 31a and 31b.

The members for the controlled dividing of the inlet flow 200 are a controlled restrictor valve 8 as well as a flow meter 81 in the first connection line 21 and a flow meter 82 in the second connection line 22. Signal-transmitting lines 801 and 802 for flow regulation connect the flow meters 81 and 82 to a controller 80 of the restrictor valve 8.

The quantity of the collected liquid can vary in the container 14 between a minimum level 37 (shown in dashed lines) and a maximum level (not shown).

The first connection line 21 for the first part flow 210 is connected to the container 14 beneath the minimum level 37. In this example, the second connection line 22 for the second part flow 220 is connected to a base of the container 14. A part space 70 bounded by a wall 7 is arranged in the container upstream of the second connection line 22. One or more openings 71 for a restricted liquid passage are provided in the wall 7 of this part container space 70 for the formation of the second part flow 220.

The wall 7 of the part space 70 for the formation of the second part flow 220 is advantageously a vertical pipe in which hole-shaped or gap-shaped openings 71 are arranged at different levels. The bottommost opening 71 can be disposed at least partly beneath the minimum level 37.

The part space 70 and the connection line 22 together form a reflux line between a liquid store and a distillation device arranged thereunder, with this reflux line including a standpipe in the store and a loop seal or a siphon (U shaped part of the connection line 22). Such a reflux line with a standpipe and a loop seal is known from EP-A-0 621 799. However, this known reflux line is not part of a reflux divider.

The connection lines 21, 22, with an open valve 8, advantageously have flow resistances of different magnitudes for the generation of part flows 210, 220 of different sizes. The second connection line 22 is provided for the larger part flow. Consequently, the flow resistance of the second connection line 22 should be smaller than that of the first connection line 21.

A liquid level 17 in the container 14 lies above the output of the distributor 31b by a height difference, of the height h1. A head of liquid of the height h1 corresponds to the force at which the first part flow 210 can be driven at a maximum. A value of the flow in the first connection line 21 depends on h1, on the flow resistance and on the controlled setting of the valve 8. The liquid in the second connection line 22 fills the line up to a level 27 at a height h2. The level 27 is adopted in dependence on the position of the liquid level 17 due to the liquid flowing behind through the openings 71 of the pipe 7 in a restricted manner.

The inlet flow 200 is divided into two part flows 210, 220, as a rule of different sizes, with a set ratio of the flow rates. For this purpose, the flow rates in the lines 21 and 22 are measured, the valve 8 is controlled with respect to the measured values and, in this context, the smaller of the part flows, i.e. the part flow 210, is set using the valve 8 in accordance with a control program.

This height difference between the extreme levels, i.e. between the maximum level and the minimum level 37, should be as small as possible (for example, smaller than 300 mm), but sufficiently large that the controllability is ensured.

The input flow 200 is varied within a working range. The ratio between a minimum and a maximum value of this working range amounts to at least 2, for example. So that the required working range and the restricted height difference can be realized between the extreme levels in the container 14, the number of openings 71 in the wall 7 of the container space 70 must, as a rule, be larger than 1. In the upward direction, increasingly larger passage areas are advantageously selected for the openings 71. The flow rates obviously decrease in the upward direction with openings 71 of equal size since the liquid pressure at the entry of the openings 71 becomes smaller towards the top. (This applies in a pronounced manner if the level 27 in the connection line 22 is beneath the minimum level.) The reduction of liquid pressure can be partly compensated by the increasing size of the openings 71. To be able to empty the container 14 on a shut-down of the column 1, a drainage opening 72 is provided at the foot of the container space 70 in addition to the openings 71 and an only very small contribution to the part flow 220 results from said drainage opening.

Figure 2B:
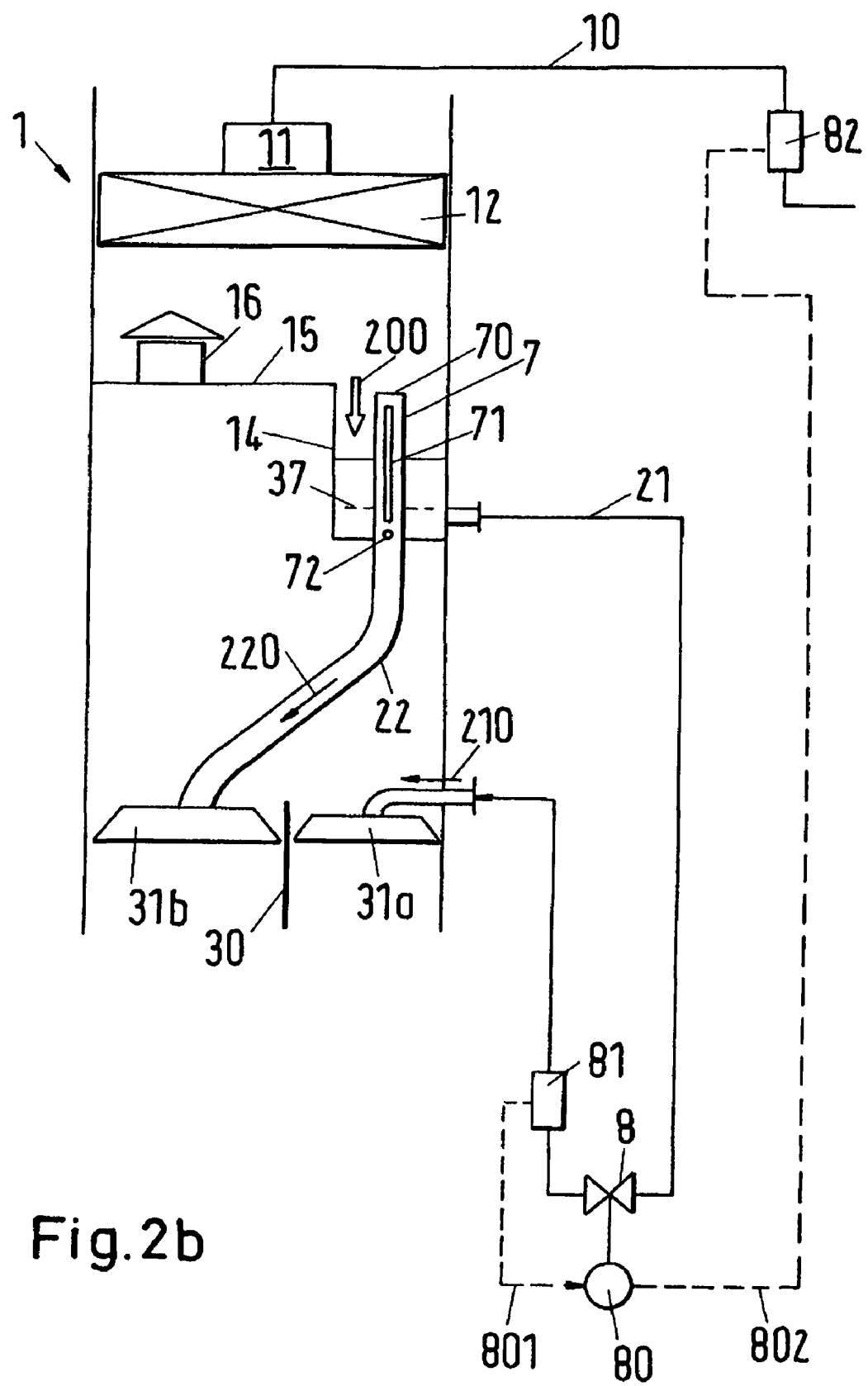
FIG. 2b illustrates a schematic view of a modified reflux divider in accordance with the invention.

Referring to FIG. 2b, wherein like reference characters indicate like parts as above, the reflux divider may be modified so that the part flow 220 in the pipe 22 is conducted inside the column to the distributor 31b and, thus, to the portion 3b for the transfer of material. On the one hand, the pipe layout 22 is thereby simplified and two wall openings in the wall of the column 1 are saved; on the other hand, the flow of reflux flow in the line 10 must then be measured with the help of the flow meter 82 for a control of the valve 8.

The signal from the measuring unit 82 is applied to the controller 80 via the measuring line 802 as in the previous variant. The difference from the reflux flow in the line 10 and the part flow 210 plus a specific correction term is then used instead of the flow rate of the part flow 220 in the controller program for the calculation of the valve position of the valve 8, said correction term taking account of the change in the reflux flow in the line 10 and in the inlet flow 200 due to liquid formation in the packing part 12.

Instead of a single reflux flow in the line 10, another arrangement would also be conceivable here, for example with a further flow, in the upper part of the column 1 above the dividing wall 30. It must, however, be considered in this context that the information on the liquid quantity must be present in the inlet flow 200 for a suitable control of the part flows 210 and 220.

Further variants are possible, for example: an individual gap-shaped opening can also be provided instead of a plurality of openings 71. The upper end of the part space 70 (standpipe) can be open or closed. The part space 70 can be made as a relatively short overflow pipe (with or without lateral openings).

In addition, pumps can additionally be provided in the connection lines 21 and 22 to be able to manage with smaller heights h1 and h2 (see FIG. 2).

Figure 3:
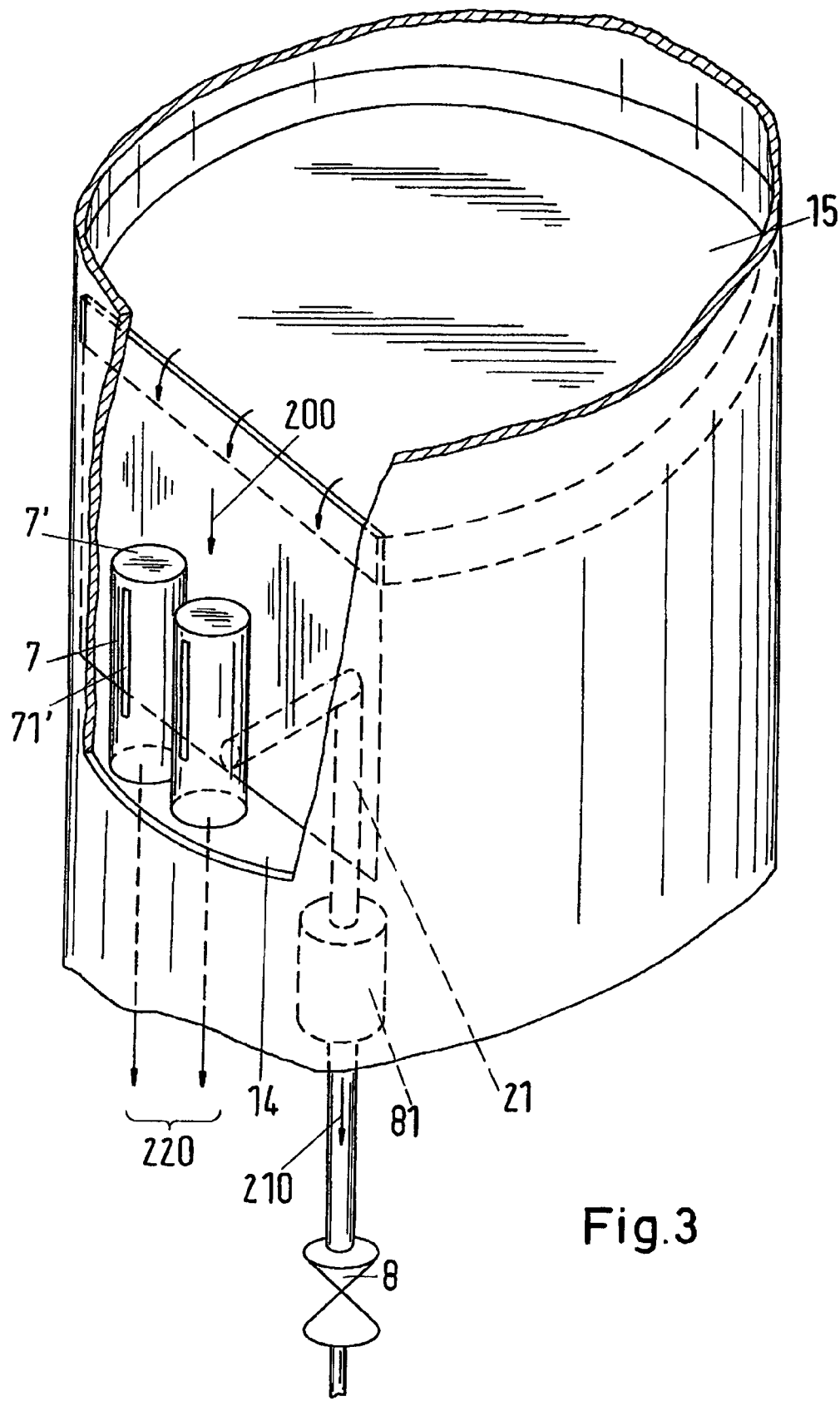
FIG. 3 illustrates a part perspective view a test set-up provided for carrying out measurements in a reflux divider in accordance with the invention.

Referring to FIG. 3, wherein like reference characters indicate like parts as above, a test set-up for the reflux divider in accordance with the invention contains a pair of standpipes (part space 70, pipe 7) which respectively have gap-shaped openings 71' (with a vertical length of 200 mm; a horizontal width b of 8 mm). The pipes 7 are upwardly closed by a cover 7'. The inlet flow 200, which is fed by a circulating pump (not shown) flows from the tray 15 over an overflow weir into the container 14 in which the standpipes are arranged. The liquid accumulates in the container 14 up to a level which is above the lowest point of the gap-shaped openings 71' by a height ho. The first part flow 210 flows through the line 21 and the flow meter 81, with the amount of the part flow 210 being limited via the valve 8. The second part flow 220 is composed of the flows flowing out through the standpipes.

The flow rate of the part flow 220 is determined from the difference between the inlet flow 220 measured with the flow meter 82 and the part flow 200.

Figure 4:
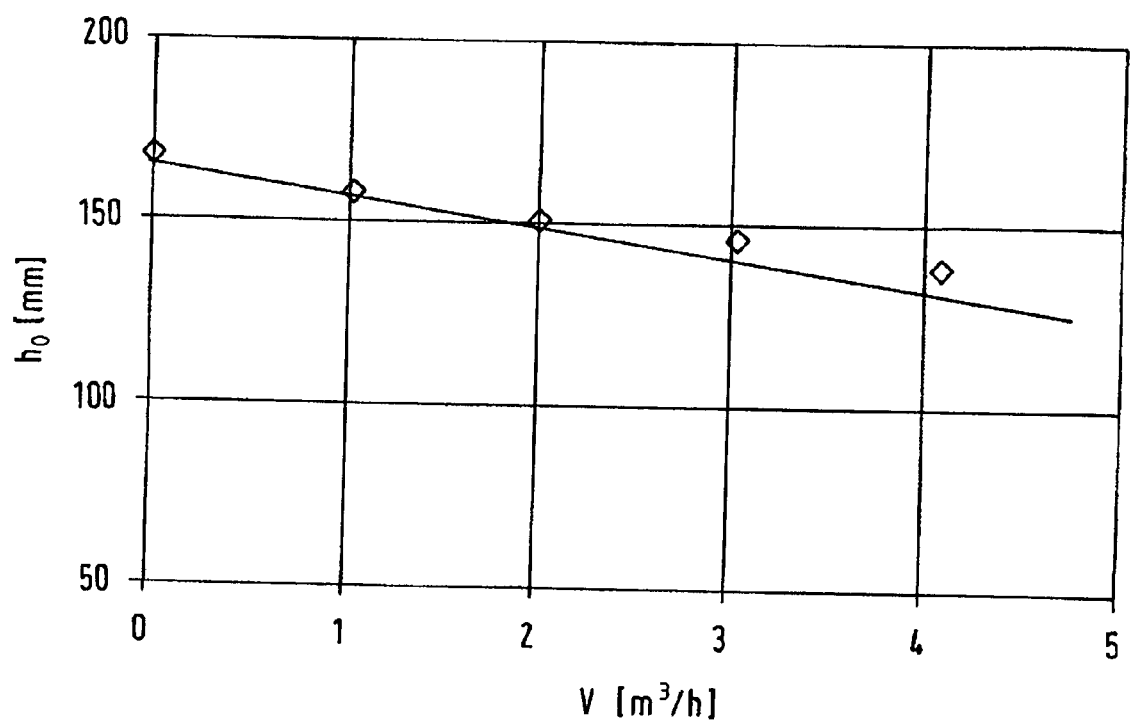
FIG. 4 graphically illustrates the measurement results obtained in the test set-up of FIG. 3.

Referring to FIG. 4, a graph with measurement results obtained with the trial set-up is shown wherein measured points (indicated as diamonds) represent the height ho in millimeters (mm) in dependence on the volume flow V in cubic meters per hour (m³/hr) of the first part flow 210 (with the inlet flow 200 being of equal size for all measured points indicated: 14 m³/h).

The measured points are located, with slight deviations, above a curve which was calculated by means of a theoretically derived relationship based on empirical principles. This relationship is (where g=acceleration due to gravity and b'=fourfold gap width in millimeters (mm)).

$$V = 14 - 0.41 \cdot b \cdot h_0^{1.5} \cdot \sqrt{2g}$$

What is claimed is:

1. A column comprising
   at least a pair of portions for the transfer of material disposed in parallel;
   a vertical dividing wall separating said pair of portions;
   a liquid collector above said dividing wall for receiving a flow of reflux liquid, said liquid collector having a ring passage for collecting the reflux liquid therein between a minimum level and a maximum level thereof; and
   a reflux divider for dividing of the reflux liquid for delivery to each of said pair of portions, said reflux divider including a first connection line connected to said ring passage below said minimum level to conduct a first part flow of the reflux liquid therefrom to a first of said pair of portions, an enclosed chamber disposed within said ring passage and having at least one opening communicating with said ring passage for a restricted flow of liquid reflux into said chamber to form a second part flow of the reflux liquid and a second connection line in communication with said chamber to conduct said second part flow of the reflux liquid therefrom to a second of said pair of portions.

2. A column as set forth in claim 1 further comprising a controlled restrictor valve in the first connection line, a first flow meter connected between said first connection line and said valve for delivering a signal to said valve on dependence on the flow in said first connection line and a second flow meter for measuring the flow in at least one said second connection line and a flow of reflux liquid to said ring passage, said second flow meter being connected to said valve for delivering a signal to said valve on dependence on the measured flow.

3. A column as set forth in claim 1 wherein said chamber is a vertical pipe and said opening therein is a vertical gap.

4. A column as set forth in claim 1 wherein said chamber is a vertical pipe having a plurality of openings therein at different heights.

5. A column as set forth in claim 1 wherein said second connection line has a smaller flow resistance than said first connection line for the production of part flows of different sizes and wherein said second connection line is provided for the larger part flow.

6. A column as set forth in claim 1 wherein the height difference between said maximum level and said minimum level is less than 300 mm and said chamber has two of said openings.

7. A column as set forth in claim 6 further comprising a drainage opening in said chamber below said minimum level.

8. A column as set forth in claim 1 wherein said first connection line and said second connection line extend outside said column.

9. A column as set forth in claim 1 wherein said first connection line extends outside said column and said second connection line extends within said column.

10. A column as set forth in claim 1 wherein one of said portions has one of a collector and a distributor for the transfer of material forming a feed point for liquid mixture to be separated and including at least three components and the other of said portions has one of a collector and a distributor for the transfer of material forming a dispensing point for a product.

* * * * *